(12) United States Patent
Kingdon et al.

(10) Patent No.: US 10,346,074 B2
(45) Date of Patent: Jul. 9, 2019

(54) METHOD OF COMPRESSING PARITY DATA UPON WRITING

(71) Applicant: Synamedia Limited, Middlesex (GB)

(72) Inventors: Kevin Wayne Kingdon, Hayward, CA (US); Ryan Michael Okelberry, Provo, UT (US)

(73) Assignee: SYNAMEDIA LIMITED, Middlesex (GB)

( * ) Notice: Subject to any disclaimer, the term of this patent is extended or adjusted under 35 U.S.C. 154(b) by 28 days.

(21) Appl. No.: 15/208,360

(22) Filed: Jul. 12, 2016

(65) Prior Publication Data

US 2017/0147265 A1 May 25, 2017

Related U.S. Application Data

(60) Provisional application No. 62/258,505, filed on Nov. 22, 2015.

(51) Int. Cl.
*G06F 3/06* (2006.01)
*G06F 11/10* (2006.01)

(52) U.S. Cl.
CPC .......... *G06F 3/0641* (2013.01); *G06F 11/108* (2013.01)

(58) Field of Classification Search
None
See application file for complete search history.

(56) References Cited

U.S. PATENT DOCUMENTS

| | | | | |
|---|---|---|---|---|
| 5,860,090 A * | 1/1999 | Clark | .................. | G06F 11/1076 711/112 |
| 6,442,659 B1 * | 8/2002 | Blumenau | ........... | G06F 11/1076 711/114 |
| 8,165,221 B2 * | 4/2012 | Zheng | ..................... | H03M 7/00 375/240.25 |
| 8,954,392 B2 * | 2/2015 | Das | ..................... | H03M 7/3091 707/644 |
| 9,645,754 B2 * | 5/2017 | Li | ......................... | G06F 3/0619 |

(Continued)

OTHER PUBLICATIONS

C. Constantinescu and M. Lu, "Quick Estimation of Data Compression and De-duplication for Large Storage Systems," 2011 First International Conference on Data Compression, Communications and Processing, Palinuro, 2011, pp. 98-102.*

*Primary Examiner* — Steve N Nguyen
(74) *Attorney, Agent, or Firm* — Fernando & Partners, LLP; Prateek Bhatnagar

(57) ABSTRACT

A disclosed method is performed at a fault-tolerant object-based storage system configured to synthesize parity data in order to protect stored data from loss, the fault-tolerant object storage system including a plurality of storage entities each configured to store data on an object-basis. The method includes determining a first parity value for a first data block set of one or more data block sets, wherein the first data block set comprises one or more respective data blocks, each respective data block associated with a respective storage entity of the plurality of storage entities. The method further includes generating a first compressed parity indicator for the first data block set, corresponding to the first parity value, and storing the first compressed parity indicator in a stripe of parity data in place of the first parity value within a first block set comprising the first data block set.

19 Claims, 12 Drawing Sheets

(56) References Cited

U.S. PATENT DOCUMENTS

| | | | |
|---|---|---|---|
| 2009/0198887 A1* | 8/2009 | Watanabe | G06F 11/1076 |
| | | | 711/114 |
| 2010/0037118 A1* | 2/2010 | Saliba | G06F 3/0608 |
| | | | 714/752 |
| 2010/0162055 A1* | 6/2010 | Morita | G06F 11/073 |
| | | | 714/704 |
| 2011/0307659 A1* | 12/2011 | Hans | G06F 3/0613 |
| | | | 711/114 |
| 2015/0058582 A1* | 2/2015 | Baldwin | G06F 3/06 |
| | | | 711/158 |
| 2015/0063374 A1* | 3/2015 | Venkatachalam Jayaraman | |
| | | | H04L 69/04 |
| | | | 370/476 |
| 2015/0161000 A1* | 6/2015 | Kim | G06F 11/108 |
| | | | 714/6.24 |
| 2015/0349805 A1* | 12/2015 | Tsai | H03M 13/2906 |
| | | | 714/755 |
| 2016/0246537 A1* | 8/2016 | Kim | G06F 11/108 |

\* cited by examiner

METHOD OF COMPRESSING PARITY DATA UPON WRITING

TECHNICAL FIELD

The present disclosure relates generally to storage systems, and in particular, to enabling more efficient storage of parity data used to recover data.

BACKGROUND

In previously available storage systems data mirroring has been used to provide fault tolerance. With data mirroring, multiple copies of an object are stored on a vault disk (or other storage mediums) and again on different disks, so that an individual disk failure damages or results in the loss of merely one copy of the data. A downside of data mirroring is that it relies on significantly increasing memory utilization for each degree of fault tolerance. For example, in order to provide resilience for one disk failure, twice as much disk space is utilized. In order to provide resilience for two disk failures, three times the disk space is utilized.

Another problem with data mirroring is that it would result in a policy conflict for recording various media programs, by cable and other media delivery service providers. For example, when recording a program on behalf of a customer, the Digital Millennium Copyright Act (DMCA) of Oct. 28, 1998, provides that one and only one unique instance of the data may be created for the customer. In this context, data mirroring for the sake of providing fault tolerance violates copyright and associated fair use restrictions. Regardless of the approach selected to provide fault tolerant storage, there is a preference to reduce the amount of data that is stored, without compromising the ability to recover content data in the event of a device failure or another type of data loss within the storage system.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings. The appended drawings, however, illustrate only some example features of the present disclosure and are therefore not to be considered limiting, for the description may admit to other effective features.

Figure 1A:
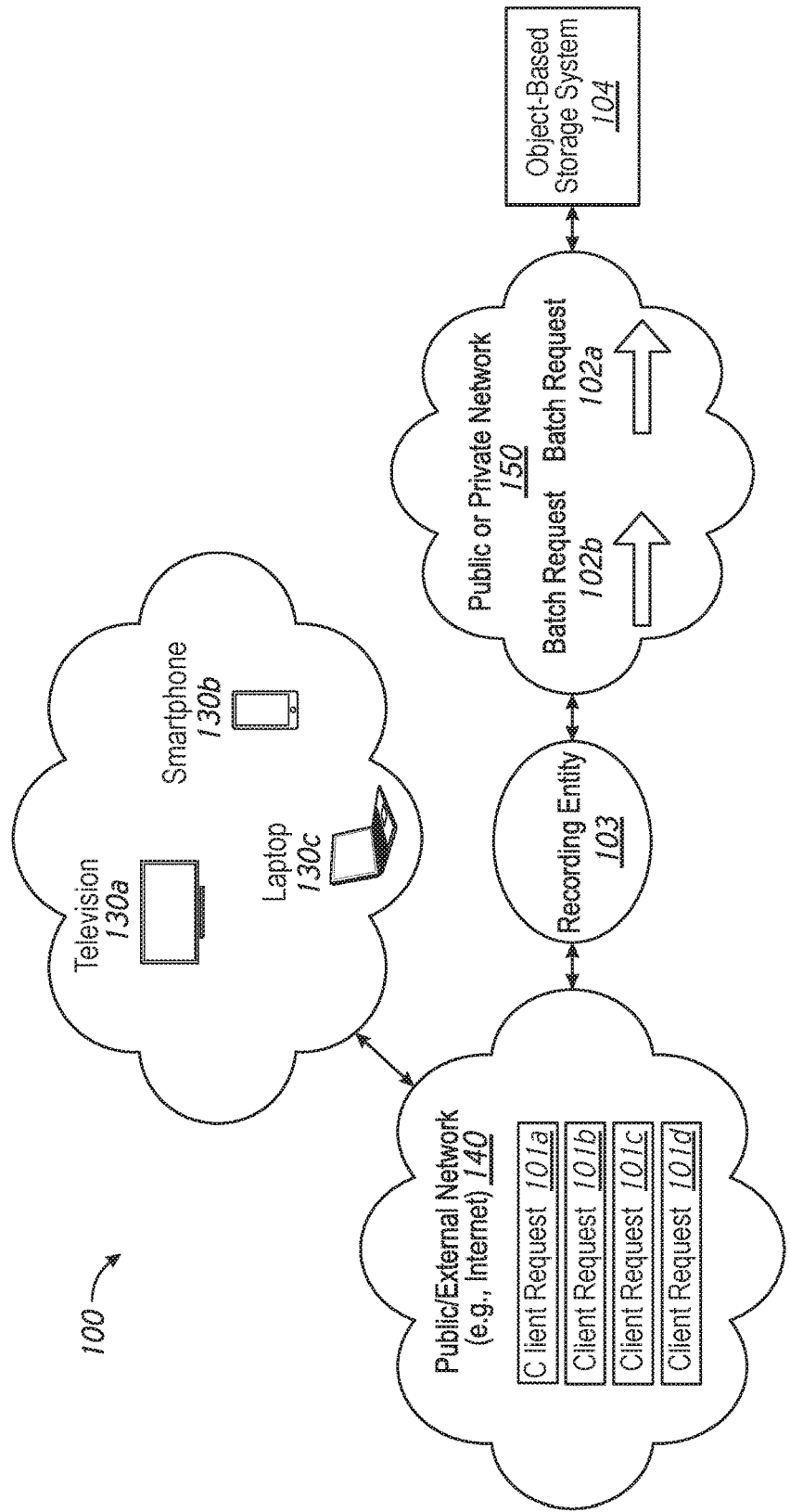
FIG. 1A is a block diagram representation of a storage environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described herein in order to provide a thorough understanding of the illustrative implementations shown in the accompanying drawings. However, the accompanying drawings merely show some example aspects of the present disclosure and are therefore not to be considered limiting. Those of ordinary skill in the art will appreciate from the present disclosure that other effective aspects and/or variants do not include all of the specific details of the example implementations described herein. While pertinent features are shown and described, those of ordinary skill in the art will appreciate from the present disclosure that various other features, including well-known systems, methods, components, devices, and circuits, have not been illustrated or described in exhaustive detail for the sake of brevity and so as not to obscure more pertinent aspects of the example implementations disclosed herein.

Overview

Enterprise data storage can benefit from techniques enabling fault-tolerant writing of large volumes of data across a set of one or more storage entities. In the context of recording media programs (e.g., television programs and movies), data is typically written to a set of storage entities much more often than it is read. In light of these considerations, and in accordance with various implementations, a method is disclosed for storing parity data in a compressed format. In some implementations this compressed format of stored parity data includes storing one copy of uncompressed parity data and several corresponding links to the one copy of uncompressed parity data.

Various implementations disclosed herein include apparatuses, systems, and methods for compressing parity data corresponding to a data segment. For example, in some implementations, a method is performed at a fault-tolerant object-based storage system configured to synthesize parity data in order to protect stored data from loss, where the fault-tolerant object-based storage system includes a plurality of storage entities each configured to store data on an object-basis. The method includes determining a first parity value for a first data block set of one or more data block sets, where the first data block set comprises one or more respective data blocks, each respective data block associated with a respective storage entity of the plurality of storage entities. The method further includes generating a first compressed parity indicator for the first data block set, corresponding to the first parity value, and storing the first compressed parity indicator in a stripe of parity data in place of the first parity value within a first block set comprising the first data block set.

Example Embodiments

Figure 1B:
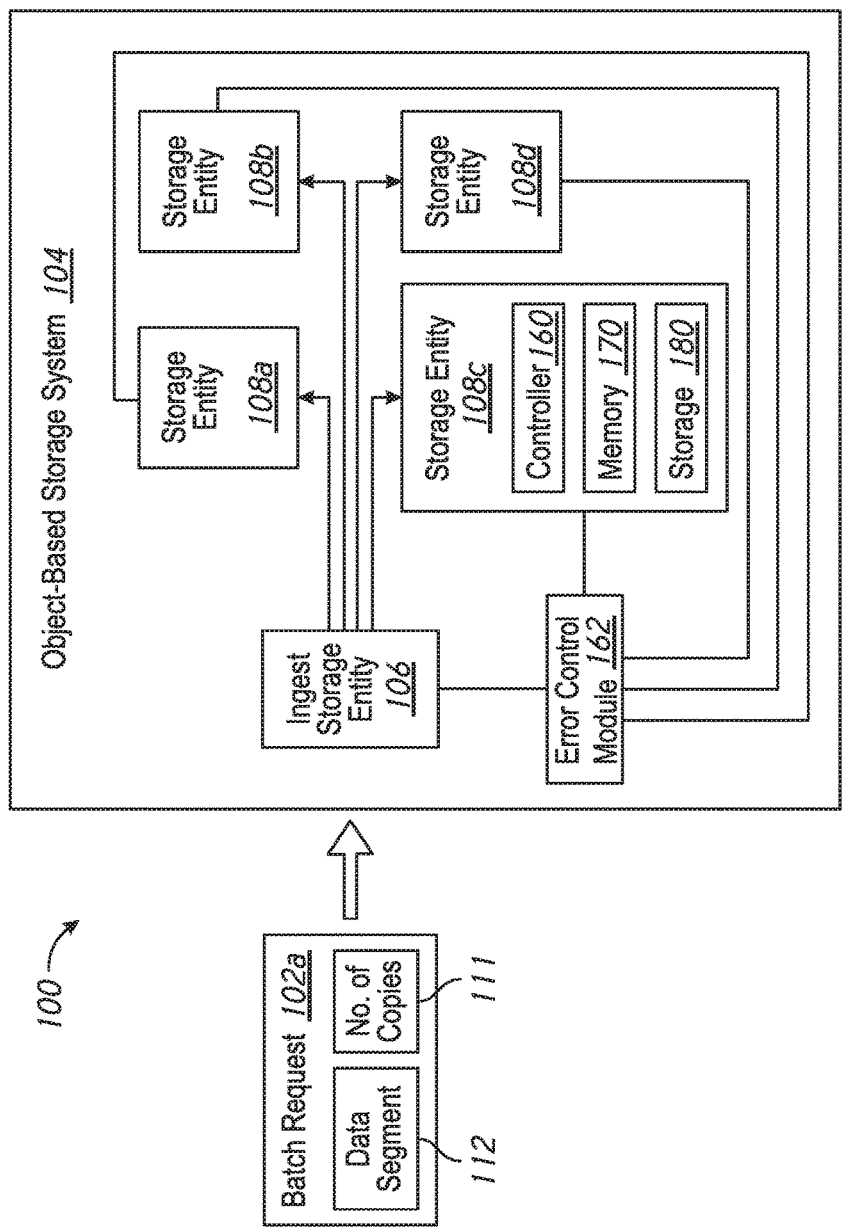
FIG. 1B is a block diagram representation of a storage environment in accordance with some implementations.

FIGS. 1A and 1B are block diagram representations of a storage environment 100 in accordance with some implementations. While certain specific features are illustrated, those of ordinary skill in the art will appreciate from the present disclosure that various other features have not been illustrated for the sake of brevity and so as not to obscure more pertinent aspects of the example implementations disclosed herein. To that end, in some implementations, the storage environment 100 includes client devices, such as a television 130a, a smart phone 130b and a laptop 130c. For the sake of brevity, in some of the examples described below, the television 130a, the smartphone 130b, and the laptop computer 130c are also referenced collectively hereinafter as client devices 130 (although reference indicia is not used in FIG. 1A). Moreover, as with the other elements shown in FIG. 1, those of ordinary skill in the art will appreciate that any number of client devices 157 may be used in combination the data networking environment 100 in accordance with various implementations. In some implementations, storage environment 100 includes client devices not shown, such as set-top boxes, video game consoles, tablets, computers, and any other electronic devices configured to obtain and convey audiovisual media information. FIG. 1A illustrates that one or more client devices are connected to a public or external network 140 (e.g., the Internet). In some implementations, a respective client device, such as the television 130a, is connected to public or external network 140 to transmit one or more read/write requests, such as client requests 101a, 101b, 101c and 101d, to a recording entity 103 and/or to object-based storage system 104 without first being transmitted to recording entity 103.

In some implementations, storage environment 100 is configured to store audio/visual data associated with multicast (e.g., broadcast) content and acts as a digital video recorder (DVR). As both data and read/write requests can be received over a network, the storage system 100 can function as a cloud-based DVR. To that end, in some implementations, a respective client request, such as client request 101a, includes information identifying a portion of a media item, such as a data segment. In some implementations, a client device transmits several client requests in succession, to enable storage of a desired portion of a media item. For example, one client request corresponds to two seconds of data for a news program that client device 130a requests to be recorded. In this example, client device 130a sends nine hundred successive client requests through public network 140 to recording entity 103, to record half an hour of the news program.

FIG. 1A also illustrates that in some implementations, storage environment 100 includes a recording entity 103 connected by a public or private network 150 to an object-based storage system 104. In some implementations, recording entity 103 receives one or more client requests and generates one or more batch requests. For example, in a media storage environment, a client device, such as laptop 130c, sends a client request 101a through network 150 to recording entity 103, to record a portion of a particular media item. In some implementations, recording entity 103 is managed or operated by an entity that provides multimedia content to end users, such as a cable television provider, an online-streaming platform and/or a satellite programming provider. In some implementations, recording entity 103 aggregates one or more client requests into batch requests. For example, recording entity 103 receives one hundred client requests within a predefined batching time period from one hundred distinct client devices, to record the same two seconds of a particular media item, and translates those one hundred client requests into a single batch request for storage at object-based storage system 104.

In some implementations, there is a many-to-one relationship between client requests and batch requests, such that many client requests are aggregated or packaged into a single batch request, such as batch request 102a. In some implementations, there is a one-to-one relationship between client requests and batch requests. For instance, if only one received client request corresponds to recording a particular media item within the predefined batching time period, recording entity 103 creates a batch request with the single client request. In some implementations, storage environment 100 does not include recording entity 103, and client requests are received by object-based storage system 104. In some implementations, recording entity 103 is a part of object-based storage system 104.

FIG. 1B illustrates a portion of storage environment 100, the object-based storage system 104 that receives batch requests corresponding to client requests 101. In some implementations, object-based storage system 104 is configured to primarily store data in one or more storage entities, on an object-basis, rather than on another basis such as a file-basis. In some implementations, object storage, or object-based storage identifies a storage architecture that stores and manages data as objects, where each object includes a globally unique identifier, data and in some implementations, metadata corresponding to the data of the object. In some implementations, object-based storage system 104 receives stand-alone client requests, or client requests packaged as batch requests, as described above with respect to FIG. 1A. In some implementations, a batch request, such as batch request 102a, includes information such as a data segment 112 and a copy count 111 to make a specific number of copies of the data segment 112. For example, data segment 112 is two seconds of data corresponding to a particular video of a basketball game, and copy count 111 indicates that five hundred copies of data segment 112 are to be stored in the storage space of object-based storage system 104, for five hundred client devices.

FIG. 1B illustrates an example of components found in object-based storage system 104. In some implementations, object-based storage system 104 includes one or more storage entities, such as servers, disks, and other computing devices, which work together to store information corresponding to a client request or batch request received by the object-based storage system 104. In some implementations, a respective storage entity such as storage entity 108a, of object-based storage system 104 stores data and/or parity back-up data, and in some implementations any storage entity can be further defined as an ingest storage entity 106. In some implementations, storage entities such as storage entities 108*a*, 108*b*, 108*c* and 108*d*, are referred to as peer storage entities with respect to ingest storage entity 106. FIG. 1B illustrates that one or more storage entities, such as storage entity 108*c*, include components such as controller 160, memory 170 (e.g., RAM), and storage space 180 (e.g., non-volatile memory). In some implementations, controller 160 for a respective storage entity has control links to every other storage entity of object-based storage system 104. While storage entity 108*c* is shown to include components such as controller 160, memory 170 and storage 180, it will be understood by one of ordinary skill in the art that any storage entity of object-based storage system 104 has one or more of these components or other components not shown.

In some implementations, object-based storage system 104 includes one or more error control modules 162. In some implementations, error control module 162 enables fault tolerant storage of data and recovery of lost data within object-based storage system 104. In some implementations, as shown in FIG. 1B, object-based storage system 104 includes a single error control module 162, which exists as a single entity or in some implementations as a combination of distributed elements. In some implementations, error control module 162 resides on a system control entity or another entity with global access to every storage entity within object-based storage system 104. In some implementations, error control module 162 includes control links to one or more storage entities such as storage entity 106 and/or storage entities 108*a*, 108*b*, 108*c* and 108*d*, for managing the fault tolerant storage of data and recovery of lost data at one or more storage entities. In some implementations, a respective error control module 162 resides within a respective storage entity. In some implementations, a respective error control module 162 resides within a respective controller of a storage entity, such as controller 160, while in some implementations error control module 162 is an entity distinct from a controller of a storage entity.

In some implementations, an ingest storage entity 106 of object-based storage system 104, receives and/or transmits data, an instruction or any type of communication from outside object-based storage system 104, such as a client request or a batch request. In some implementations, ingest storage entity 106 also receives and/or transmits various communications within object-based storage system 104, such as write requests containing write operations to storage entities such as storage entities 108*a*, 108*b*, 108*c* and 108*d*. In some implementations, a respective storage entity, is defined as an ingest storage entity 106 for a respective batch request, and is not necessarily defined as an ingest storage entity 106 for all received batch requests. For example, ingest storage entity 106 of object-based storage system 104, receives batch request 102*a* corresponding to various client requests to record an episode of a cooking show. In this example, ingest storage entity 106 is an ingest storage entity with respect to batch request 102*a*. In another example, storage entity 108*a* is defined as an ingest storage entity for a subsequent batch request. In some implementations, an ingest storage entity 106 stores and/or retrieves data associated with a request received by the ingest storage entity 106, or received by another storage entity, such as storage entity 108*a*, of object-based storage system 104. For example, in FIG. 1B, ingest storage entity 106 receives batch request 102*a*, and subsequently stores parity data corresponding to data segment 112 of batch request 102*a*.

In some implementations, object-based storage system 104 mitigates the risk of losing stored data segments 112, by distributing the storage of the requested copies of data segments 112 among various storage entities. In some implementations, object-based storage system 104 is configured to use distributed erasure coding to store information. In some implementations, object-based storage system 104 also generates and distributes storage of parity data corresponding to the data segments 112 associated with respective batch requests. For example, a batch request 102*b* (as shown in FIG. 1A) corresponds to storage of four hundred copies of a data segment 112 of a particular talk show. In this example, one hundred copies of data segment 112 are stored at storage entity 108*a* of object-based storage system 104, one hundred copies are stored at storage entity 108*b*, one hundred copies are stored at storage entity 108*c* and one hundred copies are stored at storage entity 108*d*. In this same example, parity data corresponding to data segment 112 of batch request 102*b* is stored at a first storage entity (not shown) of object-based storage system 104, and parity data corresponding to data segment 112 of batch request 102*b* is also stored at a second storage entity (not shown) of object-based storage system 104. This example illustrates an object-based storage system 104 configured to store and distribute data and corresponding parity data for a given batch request, across four data-storing storage entities and two parity-storing storage entities. In some implementations, a respective object-based storage system 104 is configured with a data-to-parity storage ratio. The data-to-parity storage ratio determines how many storage entities will store content data (e.g., copies of data segment 112) corresponding to a respective batch request, and how many storage entities will store parity information corresponding to the respective batch request.

In some implementations, multiple write operations within object-based storage system 104 correspond to one batch request or client request received by an ingest storage entity 106. For example, if the data-to-parity storage ratio for object-based storage system 104 is 3:2, there are five write operations in total, one for each storage entity, corresponding to a batch request.

As described above, in some implementations, a client-based request, such as batch request 102*a*, including a data segment 112 and a copy count 111, is received by an ingest storage entity, such as ingest storage entity 106, of an object-based storage system, such as object-based storage system 104. The ingest storage entity 106 works with the other storage entities such as storage entities 108*a*, 108*b*, 108*c* and 108*d* of object-based storage system 104, to generate and store the number of copies of data segment 112 specified by copy count 111. In some implementations, data is stored within object-based storage system 104 in such a way that protects it from hardware failures or other causes of data corruption, but does not create additional copies of the data.

In some implementations, ingest storage entity 106 determines a set of storage entities, such as storage entities 108*a*, 108*b*, 108*c* and 108*d* to receive write requests corresponding to the received client-based request (e.g., batch request 102*a*). In some implementations, ingest storage entity 106 selects this set of storage entities, while in some implementations another entity within object-based storage system 104 performs this selection for ingest storage entity 106. The set of storage entities, such as storage entities 108*a*, 108*b*, 108*c* and 108*d*, corresponds to the data-to-parity storage ratio, represented by M:N, so that the set includes M data-storing storage entities assigned to store data for batch request 102*a*, and N parity-storing storage entities assigned to store parity data for batch request 102*a*. In some implementations, ingest storage entity 106 is among the M data-storing or N parity-storing storage entities for a respective batch request 102a.

Ingest storage entity 106 generates write requests for transmission to each of the determined set of storage entities. In some implementations, each write request includes information such as the data segment 112, a location for retrieving data segment 112, copy count 111, the storage entity number of the receiving storage entity (e.g., 3rd data storage entity of 5), the data-to-parity storage ratio, and whether the receiving storage entity is a parity-storing and/or data-storing storage entity. In some implementations, the storage entities of the determined set of storage entities then offload the processing burden on the ingest storage entity 106 by carrying out the write requests.

In some implementations, each storage entity obtains one copy of data segment 112 from the memory of ingest storage entity 106, and proceeds to make the appropriate number of copies on a corresponding disk. For example, storage entity 108a of object-based storage system 104, receives a write request from an ingest storage entity 106. The write request identifies where to retrieve data segment 112 from the memory of ingest storage entity 106, identifies 299 copies to be stored in object-based storage system 104, specifies that storage entity 108a is a data-storing storage entity, specifies that the data-to-parity storage ratio is 3:2 and that storage entity 108a is the third data-storing storage entity of the set of storage entities receiving associated write requests. In this example, 100 copies of data segment 112 will be stored at the first data-storing storage entity of the set, 100 copies will be stored at the second data-storing storage entity, and 99 copies will be stored at storage entity 108a. In this example, storage entity 108a determines how many copies of data segment 112 to create and store within its storage space. In some implementations, ingest storage entity 106 determines how many copies of a data segment 112 will be stored at a respective data-storing storage entity. Ingest storage entity 106 does not generate the number of copies specified by copy count 111, of data segment 112 by itself. This frees up bandwidth by preventing the transmission of potentially thousands of copies of data segment 112 between ingest storage entity 106 and storage entities such as storage entities 108a, 108b, 108c and 108d, and reduces memory and CPU usage at ingest storage entity 106.

While FIG. 1B illustrates five storage entities 106, 108a, 108b, 108c and 108d in object-based storage system 104, those of ordinary skill in the art will appreciate from the present disclosure that various other combinations of storage entities, servers and/or computing devices in object-based storage system 104 have not been illustrated for the sake of brevity. Each of the depicted example storage entities 106, 108a, 108b, 108c and 108d of the object-based storage system 104 can be implemented on the same or separate computing devices. In some implementations, the object-based storage system 104 can be a geographically-distributed storage system including multiple computing devices networked over multiple locations.

Figure 2:
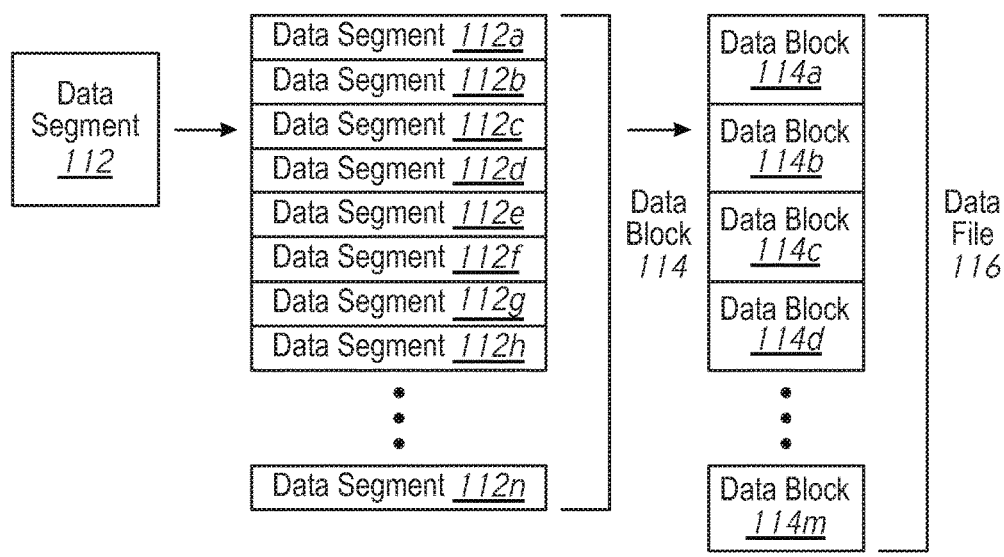
FIG. 2 is a block diagram illustrating the relationship between various units of data in accordance with some implementations.

FIG. 2 is a block diagram representation of the relationship between various units of data in accordance with some implementations. In some implementations, a data segment 112 received from a client (e.g., from client device 130a or recording entity 103 of FIG. 1A) is of a predefined size (e.g., 250 KB). In some implementations, data segment 112 corresponds to audio and/or video information and has a predefined time duration (e.g., 2 sec). In some implementations, a set of data segments 112, such as data segments 112a to 112n, are associated together and referred to as a data block 114. In some implementations, a data block 114 is a standard, predefined size in object-based storage system 104, even if data segments 112 vary in size from batch request to batch request. As a result, in various implementations, a data block 114 comprises a variable number of data segments 112. In some implementations, one or more data blocks 114, such as data blocks 114a to 114m, are associated with each other as a data file 116. In some implementations, the size of a data file 116 is related to the copy count 111 for a respective data segment 112, in a received batch request 102a, as shown in FIG. 1B. For example, if batch request 102a of FIG. 1B, included a 250 KB sized data segment 112, and a copy count 111 to create 232 copies, the resulting data file size would be 58 MB. In this example, a data block 114 is predefined to include 2 MB of data, therefore data file 116 includes 29 data blocks 114.

Figure 3A:
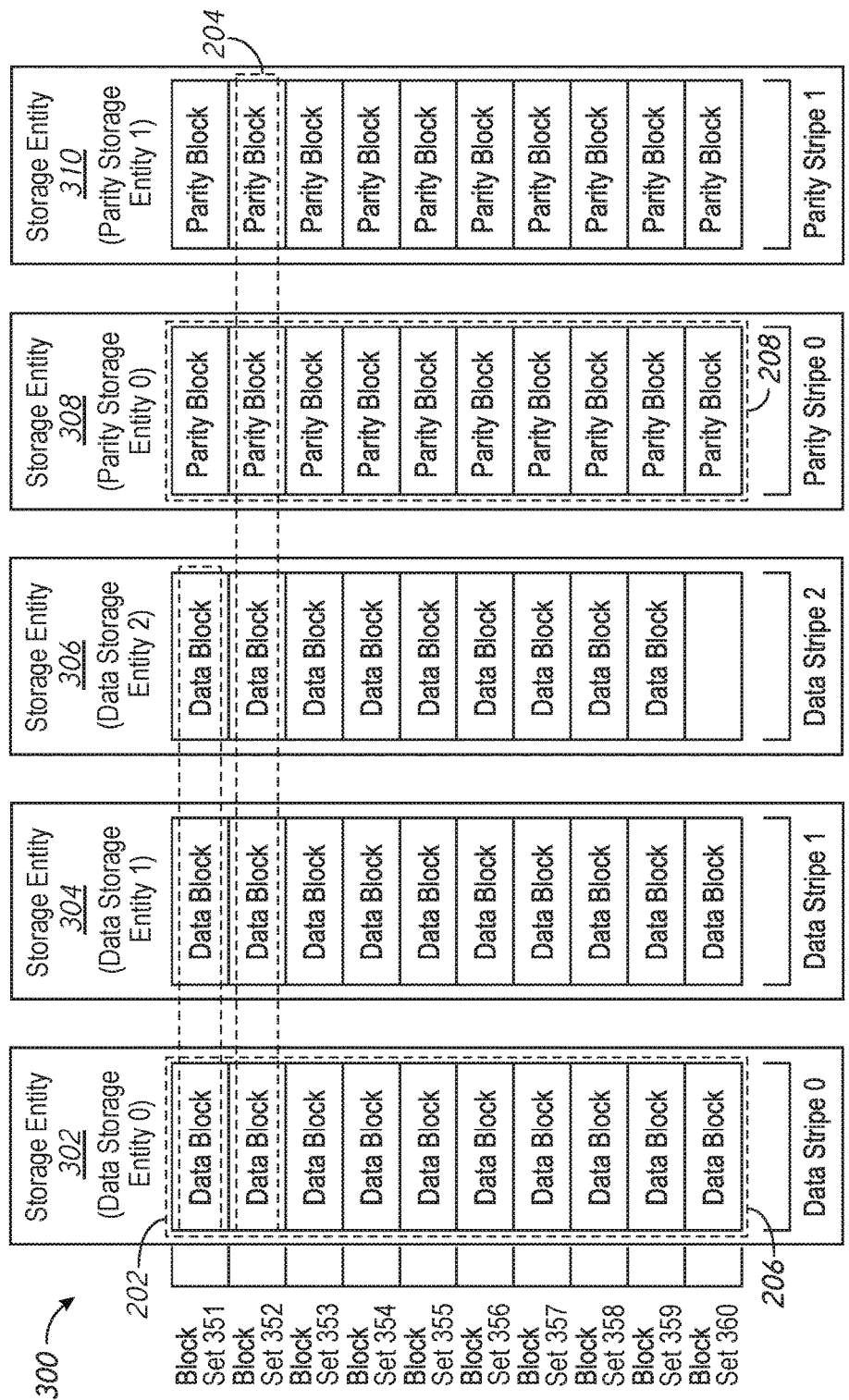
FIG. 3A is a block diagram representation of a storage environment with three data-storing storage entities and two parity-storing storage entities in accordance with some implementations.

FIG. 3A is a block diagram representation of a storage environment 300 with three data-storing storage entities 302, 304 and 306 and two parity-storing storage entities 308 and 310, in accordance with some implementations. The storage environment 300 is an example of data distribution after completing write operations of all the requested copies of a data segment received from a client and corresponding parity data segments. In some implementations, the five storage entities shown in storage environment 300, are a subset of a larger group of storage entities. In some implementations, for a respective client-based request (e.g., client request or batch request) for storing a data segment, a subset of storage entities are selected to store copies of the data segment, and corresponding parity data. In some implementations an ingest storage entity performs this selection, and in some implementations a dedicated scheduling storage entity determines which storage entities to use for storing content data (e.g., copies of the data segment) and parity data corresponding to the client request.

In some implementations, a data file (e.g., data file 116 of FIG. 2) is written across a set of storage entities of a cluster of storage entities, where some of the storage entities in the set are designated as data-storing storage entities and some of the storage entities in the set are designated as parity-storing storage entities. In some implementations, as explained in further detail with respect to FIG. 5B, a respective storage entity is a data-storing storage entity with respect to one object and a parity-storing storage entity with respect to another object. In some implementations, the data file is broken up into equally sized data blocks and parity blocks, of a predetermined size. As described above, in some implementations, an object-based storage system has a predetermined data-to-parity storage ratio of N data-storing storage entities to M parity-storing storage entities assigned to store and back-up a respective data file. The data blocks of a data file are written in such a way that the data blocks on a respective data-storing storage entity, such as the data blocks on storage entity 302 (e.g., Data Storage Entity 0), create one data stripe 206 (e.g., Data Stripe 0). A sequence of data blocks written in the same position within a respective data stripe 206 across the data-storing storage entities of the set, is referred to as a data block set 202.

The parity blocks of a data file are written in such a way that the parity blocks on a respective parity-storing storage entity, such as storage entity 308 (e.g., Parity Storage Entity 0), create one parity stripe 208 (e.g., Parity Stripe 0). A respective parity block contains parity data for a respective data block set 202 at the same position within the parity stripe 208, as the position of the respective data block set 202 in a corresponding data stripe. In some implementations, parity data corresponding to a respective data block set 202 on one parity-storing storage entity of the set of storage entities is distinct from parity data corresponding to the respective data block set 202 on another parity-storing storage entity. A sequence of data blocks and corresponding parity blocks at the same position within their respective stripes, across all the data and parity-storing storage entities, is referred to as a block set 204. Writing portions of a data file to the set of storage entities in this way allows for more efficient reading, writing, recovery and deletion of a data file.

As mentioned above, FIG. 3A illustrates that data-storing storage entities each store a data stripe 206 comprising numerous copies of a data segment. As described with respect to FIG. 2, a respective data block includes an integer value of data segment copies, and as a result, the majority of the data blocks include repeated data. In some implementations, one or more data stripes have fewer data blocks than at least one other data stripe, because the total number of data blocks does not evenly divide by the number of data-storing storage entities assigned to store the copies of the data segments. For example, FIG. 3A shows 29 data blocks stored in three data stripes of three data-storing storage entities 302, 304 and 306. In some implementations one data block of the plurality of data blocks stored across the data-storing storage entities 302, 304 and 306 is distinct because it has fewer data segments than the other data blocks. In the example of FIG. 3A, block sets 351-359 match because they all include data blocks in each data stripe, while block set 360 is distinct because it only has two data blocks. As a result, the corresponding parity information for the data block set of block set 360 will differ from parity information for the data block sets, such as data block set 202, of block sets 351-359.

Figure 3B:
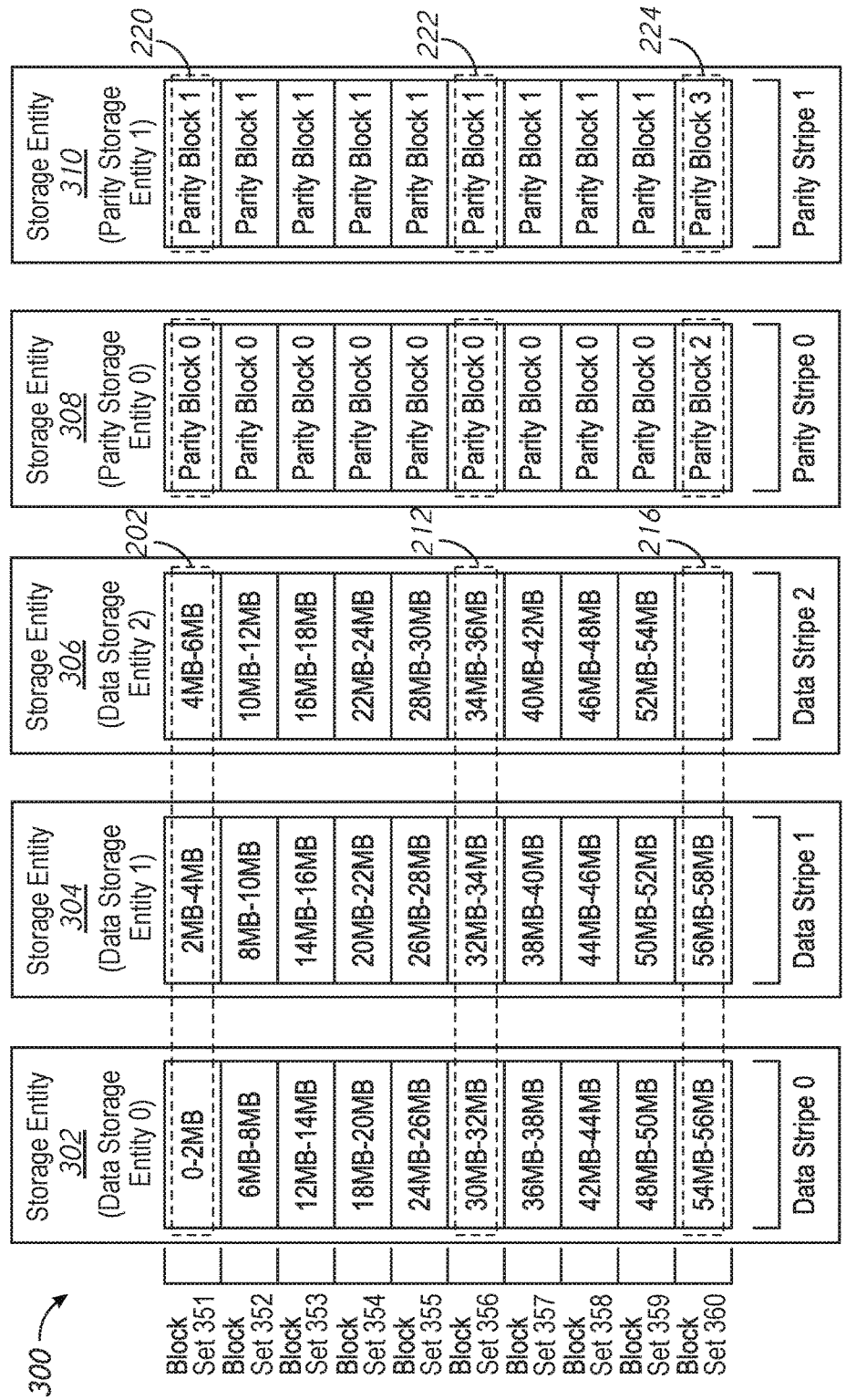
FIG. 3B is a block diagram representation of a storage environment with three data-storing storage entities and two parity-storing storage entities in accordance with some implementations.

FIG. 3B provides additional information about the same storage environment 300 of FIG. 3A. In FIG. 3B it is shown that data block set 202 comprises a 2 MB-sized data block corresponding to 0-2 MB of a data file (e.g., data file 116, in FIG. 2). It also comprises a 2 MB-sized data block corresponding to 2-4 MB of the data file, and a 2 MB-sized data block corresponding to 4-6 MB of the data file. In the example of FIG. 3B, data blocks are predefined to be 2 MB in size. In block set 351, there are also two distinct parity blocks, parity block 210 and parity block 220, that correspond to the three data blocks of data block set 202. In some implementations, the number of parity blocks in a respective block set dictates how many blocks in the block set can be recovered in case any are lost. For example, if the data blocks in block set 351 residing on storage entity 304 (e.g., data storage entity 1) and storage entity 306 (e.g., data storage entity 2) are lost, parity block 210, parity block 220 and the data block on storage entity 302 (e.g., data storage entity 0) can be used to derive the values of the two lost data blocks. In some implementations, if a storage entity fails and an entire data stripe is lost, a recovery process is performed at another storage entity to recreate the entire lost data stripe, using the intact data and/or parity data in each of the associated block sets.

FIG. 3B also illustrates different values for parity blocks stored in storage entities 308 and 310. For example, parity block 210 has a value of "Parity Block 0", corresponding to parity of data block set 202. In this example, parity block 214 has the same value of "Parity Block 0", corresponding to data block set 212, since data block set 202 and data block set 212 match. As parity block 220 corresponds to data block set 202 and parity block 222 corresponds to data block set 212, they both have the same value of "Parity Block 1." However, "Parity Block 0" and "Parity Block 1" are distinct from each other, because storage entity 308 (e.g., Parity Storage Entity 0) uses a different set of parity generation logic than storage entity 310 (e.g., Parity Storage Entity 1). For example, storage entity 308 uses odd parity generation logic and storage entity 310 uses even parity generation logic. FIG. 3B also illustrates that block set 360 has distinct parity blocks, parity block 218 and parity block 224, from the other block sets of storage environment 300. These parity blocks differ from the other parity blocks in their respective storage entities, because they correspond to parity information calculated on the basis of only two data blocks in data block set 216.

Figure 4A:
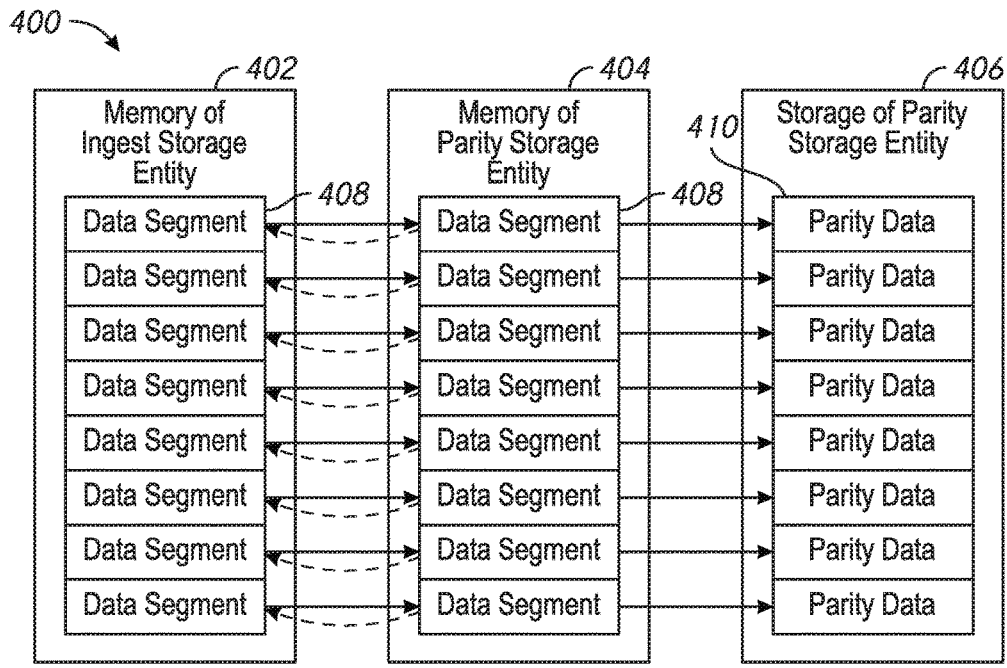
FIG. 4A is a block diagram representation of a storage environment demonstrating one approach to storing multiple copies of parity data corresponding to a data segment in accordance with some implementations.

FIG. 4A is a block diagram of a storage environment 400 demonstrating one approach to storing multiple copies of parity data corresponding to a data segment, in accordance with some implementations. In the approach shown in FIG. 4A, an ingest storage entity with memory 402, receives a client request or batch request to store multiple copies of a respective data segment 408, and to back up each of the multiple copies using parity data. The ingest storage entity generates the desired number of copies of the data segment 408 to translate into corresponding parity data segments, in memory 402 (e.g., RAM). After writing out all the copies of the data segment 408 in memory 402, the ingest storage entity sends storage data and instructions corresponding to each of the data segments 408 to one or more parity-storing storage entities. A parity-storing storage entity with memory 404 (e.g., RAM) and persistent storage 406 (e.g., non-volatile memory) receives this storage data and instruction corresponding to data segment 408, and stores each incoming data segment 408 in memory 404. The parity-storing storage entity optionally sends back a feedback message to the ingest storage entity after each data segment has successfully been stored memory 404.

This storage technique is inefficient and wasteful of computational resources. For example, if 1000 copies of data segment 408 and 500 copies of parity of data segment 408 are requested to be stored in the storage environment 400, the communication path between the ingest storage entity and one or more storage entities transports 1500 copies of data segment 408, 1500 instructions to write copies of data segment 408 to memory 404 of the one or more storage entities and 1500 acknowledgment messages after successful receipt of the data segments 408 in memory 404. FIG. 4A illustrates that the parity-storing storage entity translates the data segments 408 in memory 404 into corresponding parity data values 410 and moves them to persistent storage 406, by performing a one-to-one translation and copying action.

Figure 4B:
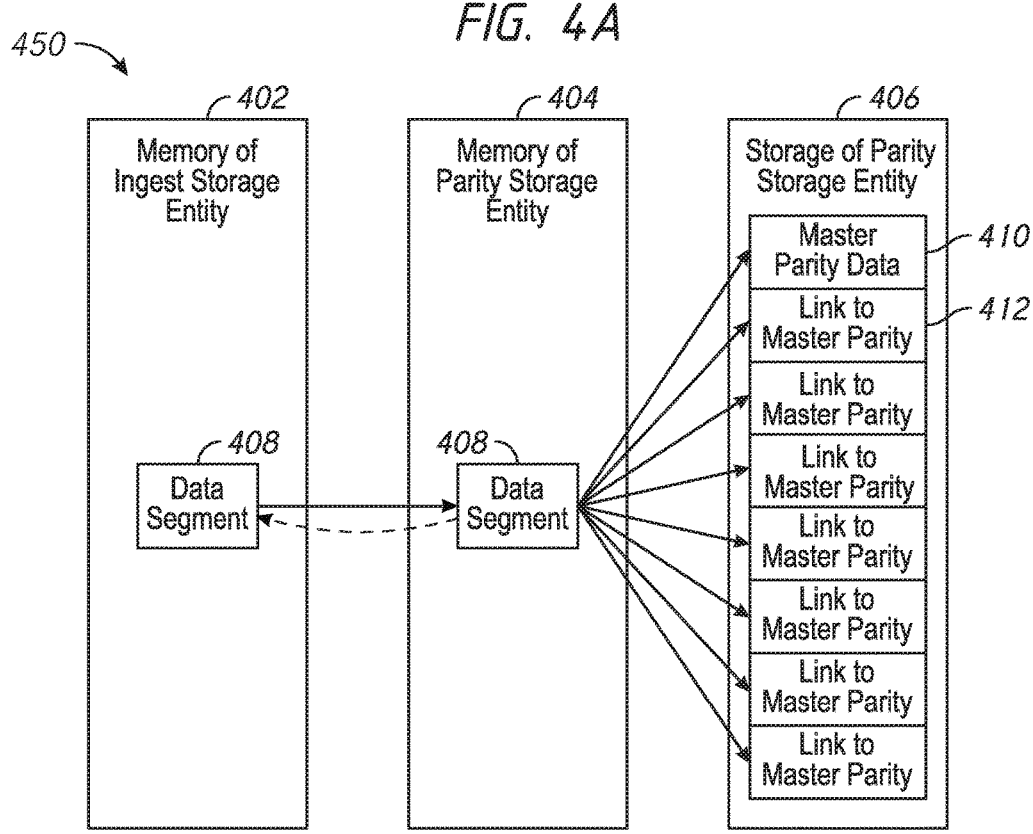
FIG. 4B is a block diagram representation of storage environment demonstrating a second approach to storing multiple copies of parity data corresponding to a data segment in accordance with some implementations.

FIG. 4B is a block diagram of storage environment 450 demonstrating a second approach to storing multiple copies of parity data corresponding to a data segment 408 in accordance with some implementations. In contrast to the approach shown in FIG. 4A, only a single copy of data segment 408 is stored in memory 402 of the ingest storage entity. In some implementations, the ingest storage entity sends a write instruction to one or more parity-storing storage entities to translate data segment 408 into corresponding parity data and to make a particular number of copies of the parity data segment. In some implementations, the ingest storage entity pushes data segment 408 to the parity-storing storage entity, while in some implementations the ingest storage entity instructs the parity-storing storage entity to retrieve data segment 408 from memory 402 when it is ready to perform the parity data storage operation. In some implementations, after the parity-storing storage entity obtains data segment 408 from the memory 402 of the ingest storage entity, it stores data segment 408 in memory 404. In some implementations, the parity-storing storage entity sends a communication back to the ingest storage entity to indicate that it has successfully stored data segment 408 in parity storage entity memory 404.

In some implementations the parity-storing storage entity does not create additional copies of data segment 408 in parity storage entity memory 404 in order to determine the value of a corresponding data block or a corresponding data block set for calculating a parity value. For example, a parity-storing storage entity extrapolates the number of data blocks in one or more data block sets residing at data-storing storage entities corresponding to data segment 408, determines that nine out of ten data block sets have matching values, and determines the value of those nine data block sets. In some implementations, the parity-storing storage entity also determines the number of data blocks in the tenth data block set, and determines the value of the tenth data block set for generating a corresponding parity value. As shown in FIG. 4B, the parity-storing storage entity generates parity data value 410 from the one copy of data segment 408, and stores parity data value 410 into persistent storage 406. In some implementations, parity data value 410 is referred to as a master parity value.

Referring back to FIG. 3B, several respective parity blocks, each corresponding to respective data block sets, have matching values. As a result, FIG. 4B illustrates that in some implementations, a single copy of a particular parity data value 410 is stored in persistent storage 406 a single time, and all other specified copies of parity data value 410 are links 412 to the one stored copy of parity data value 410. While the example of FIG. 4B illustrates the use of links to a master parity value to reduce storage overhead of predictably redundant parity information, this is just one example of a storage compression technique. In some implementations, copies of parity data that match a master parity value are compressed or encoded, and in some implementations a link to a master parity value is also compressed or encoded. In some implementations, the parity-storing storage entity sends a communication back to the ingest storage entity to indicate that it has successfully stored parity data corresponding to data segment 408, after it has successfully written parity data value 410, the necessary number of links 412, and any additional specified parity data.

Figure 5A:
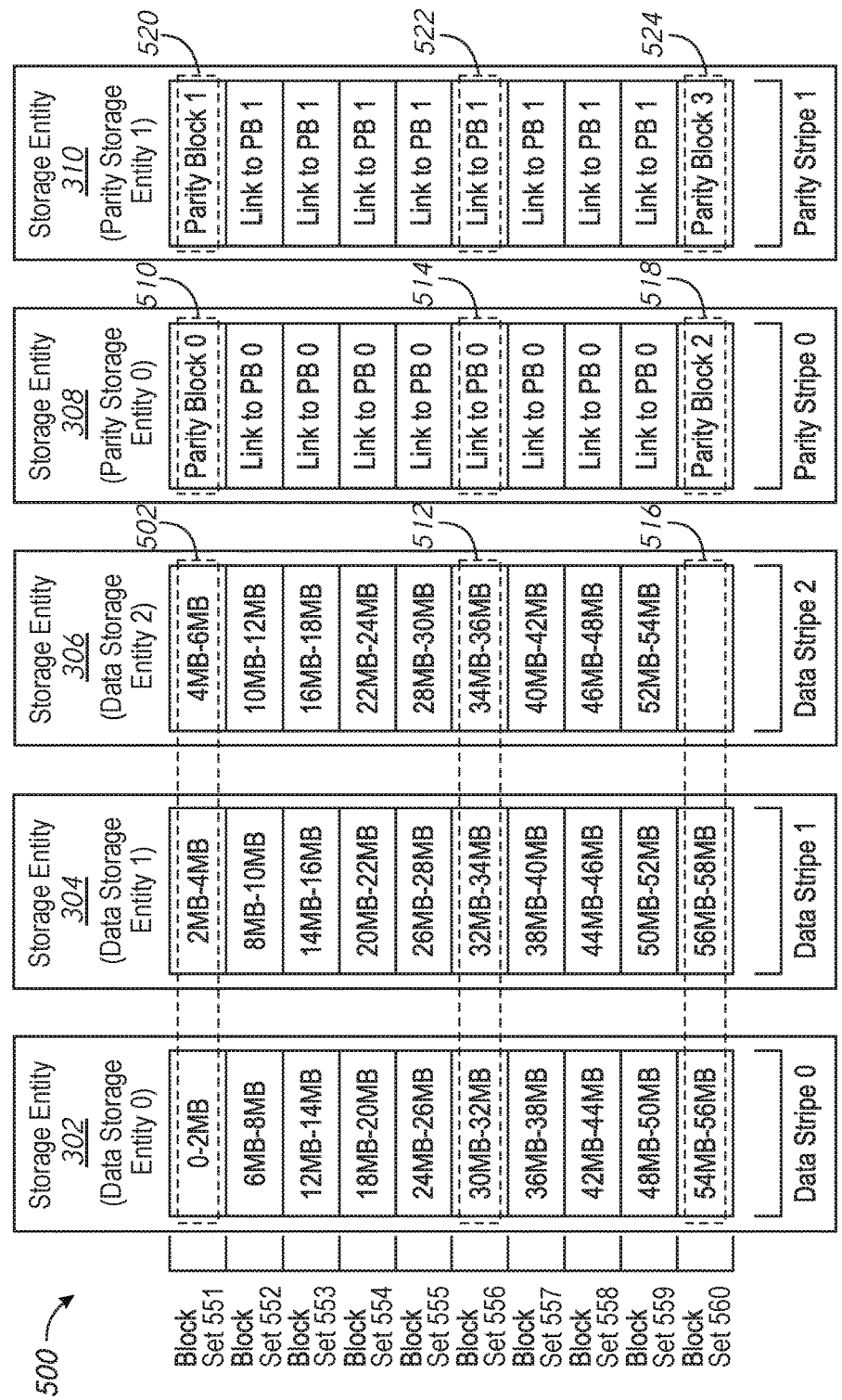
FIG. 5A is a block diagram representation of a storage environment with three data-storing storage entities and two parity-storing storage entities, demonstrating the second approach to storing multiple copies of parity data in accordance with some implementations.

FIG. 5A is a block diagram of a storage environment 500 with three data-storing storage entities 302, 304 and 306 and two parity-storing storage entities 308 and 310, demonstrating the second approach to parity data storage in accordance with some implementations. FIG. 5A illustrates an example of a storage environment 500, similar to storage environment 300 of FIG. 3B after completing a write operation of all the requested copies and corresponding parity data of a data segment received from a client. FIG. 5A illustrates the use of the parity data compression technique described above with respect to FIG. 4B. In this example, the number of stored copies of Parity Block 0 stored at storage entity 308 (e.g., Parity Storage entity 0) has decreased from nine to one. While FIG. 5A illustrates an example with ten block sets 551 to 560, one of ordinary skill in the art will appreciate that in some implementations, this compression technique can be used to decrease any number of stored copies of parity blocks.

FIG. 5A illustrates that parity block 510 contains a master parity value of "Parity Block 0", corresponding to data block set 502, and parity block 520 contains a master parity value of "Parity Block 1" corresponding to data block set 502. In storage environment 500, parity block 514 does not contain an actual copy of "Parity Block 0" as it did in storage environment 300 of FIG. 3B. In some implementations, the parity-storing storage entity determines a parity value for data block set 512, compares that determined parity value to the master parity value in the same stripe, and determines that the two values match. Using the second approach to parity data storage, parity block 514 contains a generated and stored link to the master parity value of parity block 510, and similarly, parity block 522 contains a generated and stored link to the master parity value of parity block 520. In this example, data block set 512 matches data block set 502.

In some implementations, a parity-storing storage entity assesses whether or not a respective data block set is complete. A complete data block set, such as data block set 502 or data block set 512, has a data block stored at each respective data-storing storage entity within the same position of a respective data stripe, corresponding to the same data segment for which the parity-storing storage entity is basing its parity data generation. In some implementations, if a parity-storing storage entity determines that a respective data block set is complete, it determines that a corresponding parity value for the respective data block set matches the master parity value, and may generate a link or another form of compressed parity value. In some implementations, a respective link or a respective compressed parity value occupies less storage space than a corresponding parity block. In this example, data block set 516 is not a complete data block set, therefore parity block 518 has a stored value of "Parity Block 2" and parity block 524 has a stored value of "Parity Block 3" rather than links to parity block 510 and parity block 520, respectively.

In some implementations, if a recovery request for an associated data stripe is received by a respective parity-storing storage entity such as storage entity 308 (e.g., Parity Storage Entity 0) or storage entity 310 (e.g., Parity Storage Entity 1), the respective parity-storing storage entity expands or decompresses parity data before the recovery operation can occur. The respective parity-storing entity copies out the contents of a single copy of a parity data block (e.g., parity data block 510), by the same number as the number of links (e.g., link 514) to the parity data block. This illustrates that in some implementations, the compression technique described above with respect to FIG. 4B results in additional processing time and complexity for some operations at a respective parity-storing storage entity. Nevertheless, in some implementations it also results in large savings for disk space, because a link or other form of compressed parity value occupies less storage space than a corresponding parity block.

Figure 5B:
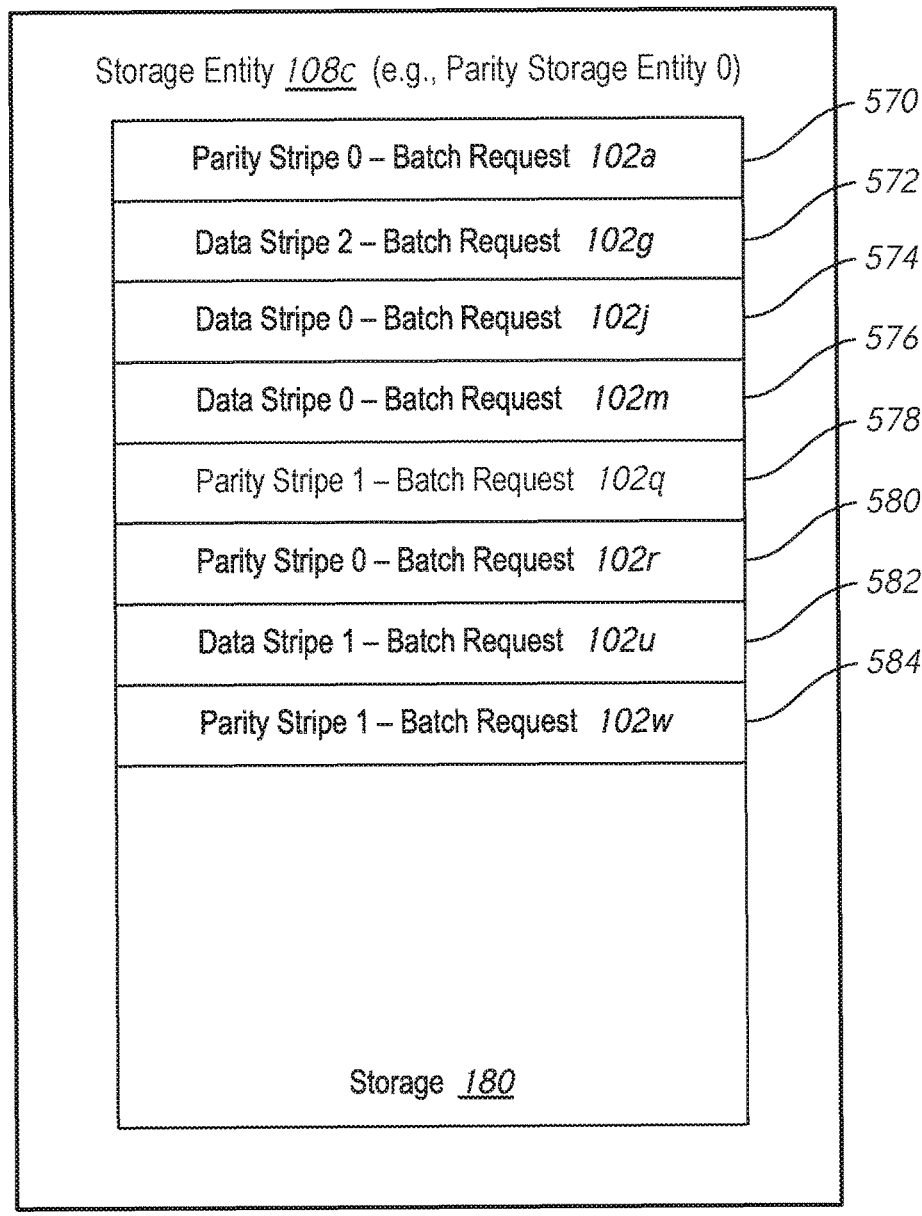
FIG. 5B is a block diagram representation of the storage space of a storage entity of a object-based storage system in accordance with some implementations.

FIG. 5B is a block diagram representation of the storage space 180 of a storage entity 108c of an object-based storage system in accordance with some implementations. FIG. 5B illustrates that a respective storage entity such as storage entity 108c, described above with respect to FIG. 1B, may contain a mixture of data stripes and parity stripes in storage space 180, each corresponding to a respective client or batch request. For example, storage entity 108c, referred to as a parity-storing storage entity "Parity Storage Entity 0," with respect to batch request 102a, stores a parity stripe 570 (e.g., Parity Stripe 0 corresponding to Batch Request 102a), data stripe 572 (e.g., Data Stripe 2 corresponding to Batch Request 102g), data stripe 574 (e.g., Data Stripe 0 corresponding to Batch Request 102j), data stripe 576 (e.g., Data Stripe 0 corresponding to Batch Request 102m), parity stripe 578 (e.g., Parity Stripe 1 corresponding to Batch Request 102q), parity stripe 580 (e.g., Parity Stripe 0 corresponding to Batch Request 102r), data stripe 582 (e.g., Data Stripe 1 corresponding to Batch Request 102*u*) and parity stripe 584 (e.g., Parity Stripe 1 corresponding to Batch Request 102*w*).

Figure 6:
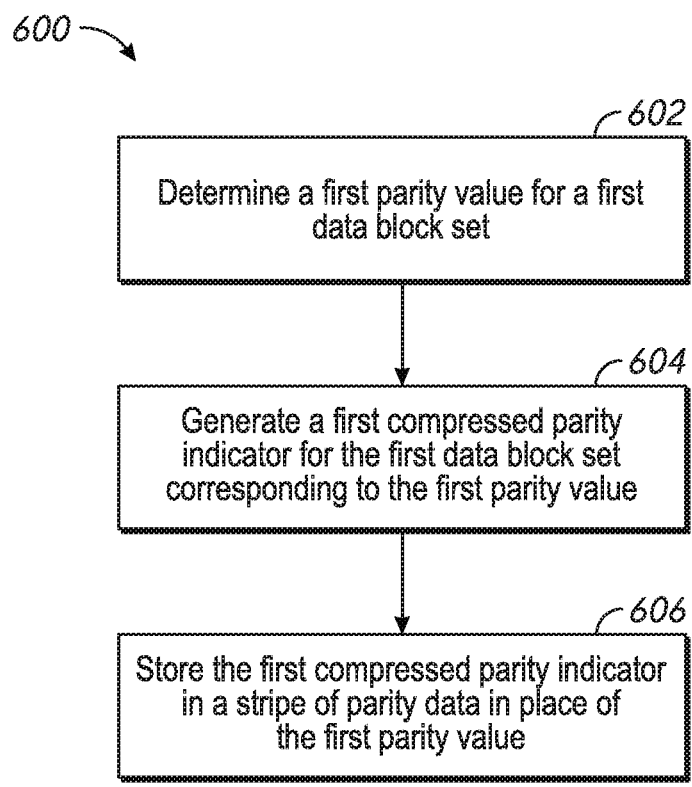
FIG. 6 is a flowchart representation of a method of writing compressed parity data in accordance with some implementations.

FIG. 6 is a flowchart representation of a method 600 of writing compressed parity data in accordance with some implementations. In some implementations and as detailed below as an example, the method 600 is performed by a storage system, such as object-based storage system 104 of FIG. 1B, or a component of the storage system such as storage entity 108*c* of FIG. 1B. In some implementations, the method 600 is performed by processing logic, including hardware, firmware, software, or a combination thereof. In some implementations, the method 600 is performed by a processor executing code stored in a non-transitory computer-readable medium (e.g., a memory). In some implementations, the method is performed by an error control module such as error control module 162 of FIG. 1B. Briefly, the method 600 includes receiving a request to write parity data corresponding to a data segment and generating a compressed parity value corresponding to the parity data write request.

Method 600 includes determining (602) a first parity value for a first data block set of one or more data block sets, where the first data block set comprises one or more respective data blocks, each respective data block associated with a respective storage entity of a plurality of storage entities. For example, in FIG. 5A, storage entity 308 determines that parity block 514 has a value of "Parity Block 0" corresponding to data block set 512. Data block set 512 has one respective data block for each of three data-storing storage entities in the set of storage entities involved in storing a particular data segment.

Method 600 includes generating (604) a first compressed parity indicator for the first data block set, corresponding to the first parity value. In FIG. 5A, storage entity 308 generates parity block 514 as a first compressed parity indicator, in this case a link, corresponding to the first parity value, "Parity Block 0."

Method 600 further includes storing (606) the first compressed parity indicator in a stripe of parity data in place of the first parity value within a first block set comprising the first data block set. For example, FIG. 3B illustrates that storage entity 308 stored parity block 214, analogous to parity block 514 of FIG. 5A, with a copy of the first parity value, "Parity Block 0." FIG. 5A illustrates that storage entity 308 stores the first compressed parity indicator, the link to the first parity value "Parity Block 0," in place of the first parity value.

Figure 7A:
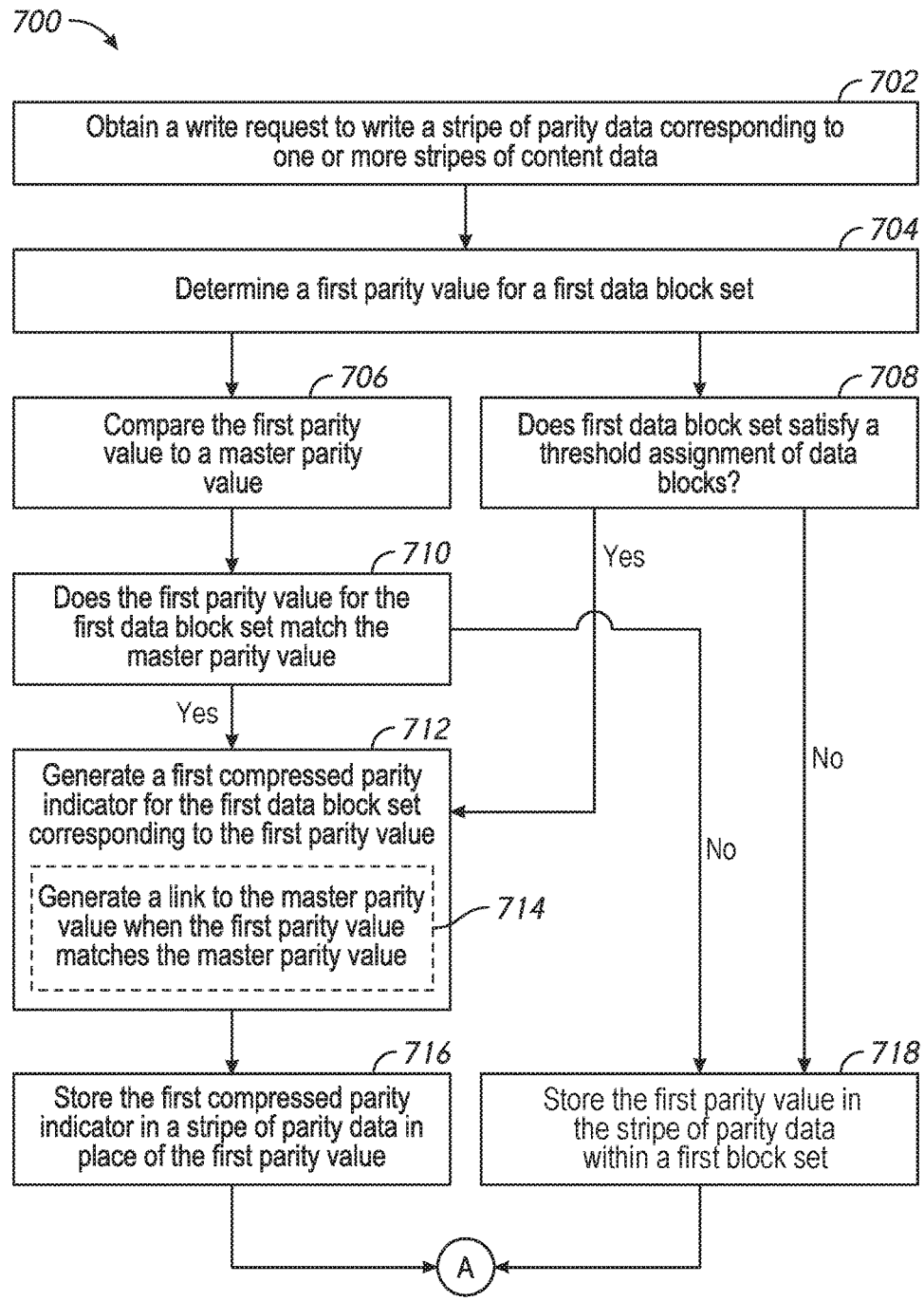
FIGS. 7A-7B are a flowchart representation of a method of writing compressed parity data in accordance with some implementations.
Figure 7B:
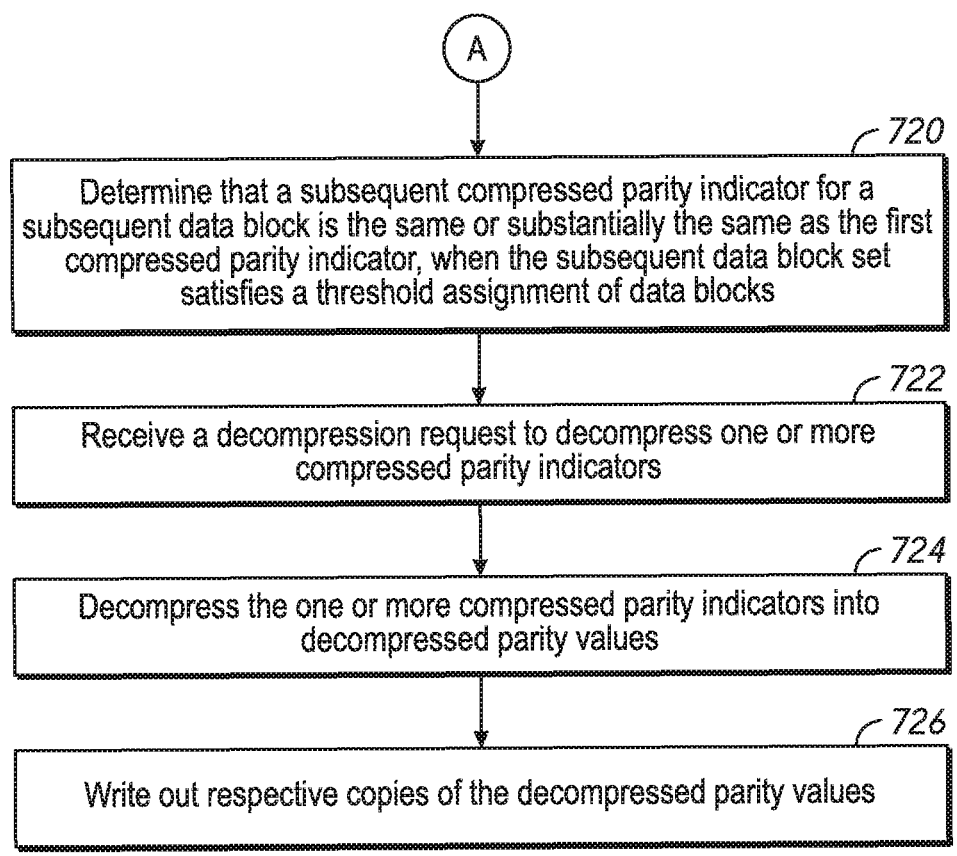

FIGS. 7A-7B are a flowchart representation of a method 700 of writing compressed parity data in accordance with some implementations. In some implementations and as detailed below as an example, the method 700 is performed by a storage system, such as object-based storage system 104 of FIG. 1B, or a component of the storage system such as storage entity 108*c* of FIG. 1B. In some implementations, the method 700 is performed by processing logic, including hardware, firmware, software, or a combination thereof. In some implementations, the method 700 is performed by a processor executing code stored in a non-transitory computer-readable medium (e.g., a memory). In some implementations, the method is performed by an error control module such as error control module 162 of FIG. 1B. Briefly, the method 700 includes receiving a request to write parity data corresponding to a data segment and generating a compressed parity value corresponding to the parity data write request.

Method 700 includes obtaining (702) a write request to write a stripe of parity data corresponding to one or more stripes of content data. In some implementations, the write request is received from an ingest storage entity. For example, in FIG. 1B, storage entity 108*a* receives a write request from ingest storage entity 106 to store 240 copies of parity data corresponding to a 250 KB data segment. In some implementations, an ingest storage entity is among the N data-storing storage entities or M parity-storing storage entities involved in the storage and backing up of a respective data segment. In some implementations, the write request received from an ingest storage entity includes one or more of an identifier of the data segment, a number of total data blocks corresponding to the data segment to be written to the cluster, a ratio of data-storing storage entities to parity-storing storage entities corresponding to the sub-request, a stripe number or identifier and a flag indicating whether the sub-request corresponds to data or parity data of the data segment.

Method 700 includes determining (704) a first parity value for a first data block set of one or more data block sets, where the first data block set comprises one or more respective data blocks, each respective data block associated with a respective storage entity of a plurality of storage entities. This is performed as described above, with respect to method 600 of FIG. 6.

In some implementations, method 700 includes comparing (706) the first parity value to a master parity value. For example, as described above with respect to FIG. 5A, in some implementations, the parity-storing storage entity compares a determined parity value for a respective data block set to a master parity value. Method 700 illustrates that in some implementations, a determination (710) is made for whether or not the first parity value for the first data block set matches the master parity value. Additionally, in some implementations, a determination (708) is made for whether or not the first data block set satisfies a threshold assignment of data blocks. For example, as described above with respect to FIG. 5A, in some implementations the parity-storing storage entity assesses whether or not a respective data block set is complete, such as data block set 512, with a data block in each data stripe of its respective block set.

FIG. 7A illustrates that in accordance with a determination that the first parity value for the first data block set does match the master parity value (e.g., Yes from block 710), or a determination that the first data block set does satisfy a threshold assignment of data blocks (e.g., Yes from block 708), method 700 includes generating (712) a first compressed parity indicator for the first data block set, corresponding to the first parity value, as described above with respect to method 600 in FIG. 6. In some implementations, this includes generating (714) a link to the master parity value when the first parity value matches the master parity value. For example, in FIG. 4B a parity storage entity generates a link 412 to master parity value 410. In some implementations, method 700 further includes storing (716) the first compressed parity indicator in a stripe of parity data in place of the first parity value within a first block set comprising the first data block set, as described above with respect to method 600 of FIG. 6.

FIG. 7A illustrates that in accordance with a determination that the first parity value for the first data block set does not match the master parity value (e.g., No from block 710), or a determination that the first data block set does not satisfy a threshold assignment of data blocks (e.g., No from block 708), method 700 includes storing (718) the first parity value in the stripe of parity data within a first block set. For example, as described above with respect to FIG. 5A, storage entity 308 determines that data block set 516 does not have a matching parity value to that of data block set 502 or 512, and that data block set 516 is not a complete data block set. In this example, storage entity 308 stores parity block 518 with a parity value of "Parity Block 2" and similarly, storage entity 310 stores parity block 524 with a parity value of "Parity Block 3."

Method 700 includes determining (720) that a subsequent compressed parity indicator for a subsequent data block set is the same or substantially the same as the first compressed parity indicator, when the subsequent data block set satisfies a threshold assignment of data blocks. For example, a storage entity assesses whether or not a subsequent data block set has a complete data block set, and if it does, the storage entity stores a link to the master parity value for the subsequent data block set.

Method 700 includes receiving (722) a decompression request to decompress one or more respective compressed parity indicators corresponding to the stripe of parity data, decompressing (724) the one or more respective compressed parity indicators into decompressed parity values and writing (726) out respective copies of the decompressed parity values, wherein each respective copy corresponds to a respective data block set. For example, in FIG. 5A, storage entity 310 receives a request to decompress its parity data in parity stripe 1 (e.g., as a part of a recovery operation). In this example, storage entity 310 copies out parity block 520, with a value of "Parity Block 1" for each of block set 552 to block set 559. In some implementations, a recovery storage entity is able to read links to parity blocks, and decompression is not necessary for a recovery operation.

Figure 8:
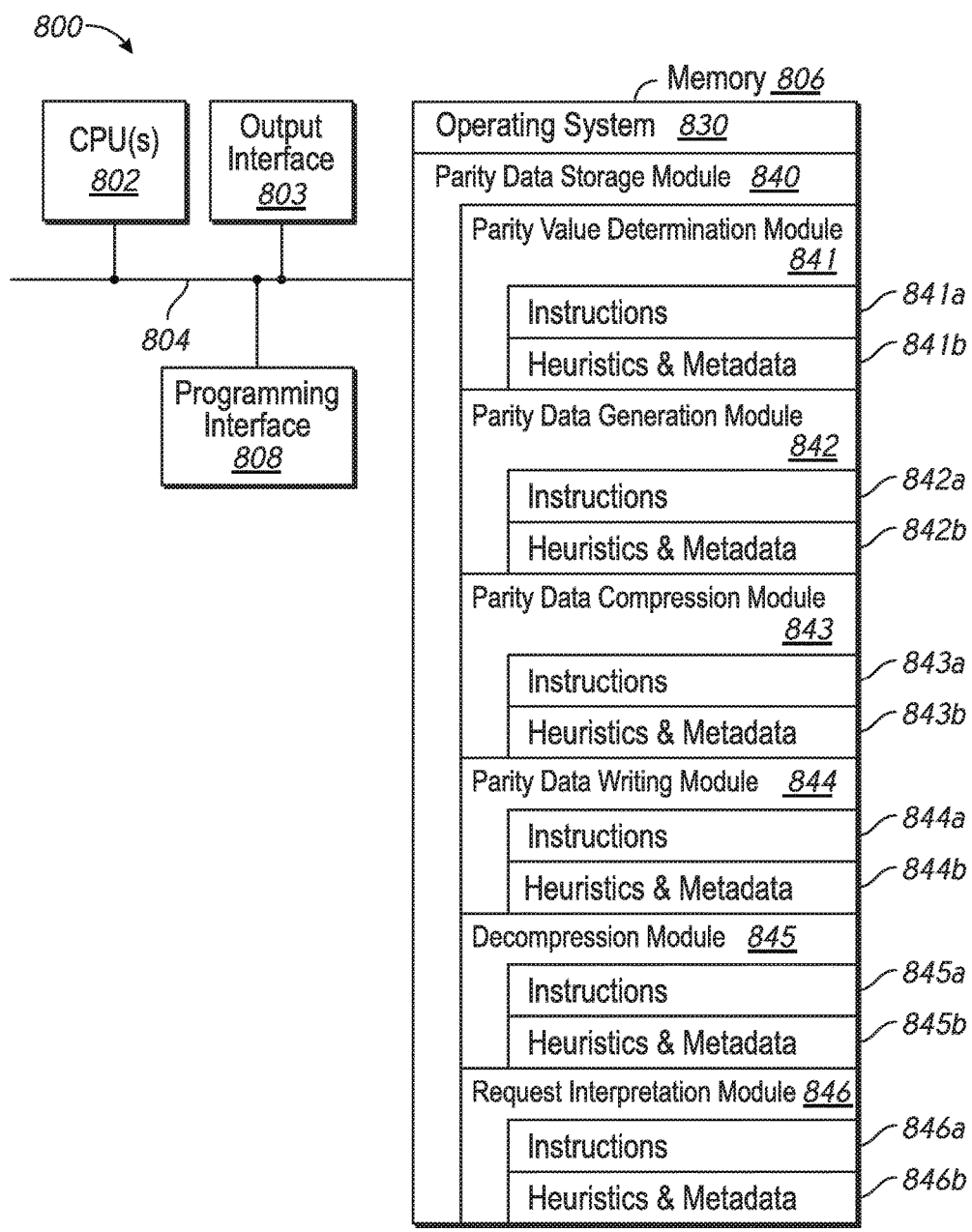
FIG. 8 is a block diagram of a computing device of an object-based storage system in accordance with some implementations.

FIG. 8 is a block diagram of a computing device 800 in accordance with some implementations. In some implementations, the computing device 800 corresponds to a storage entity such as storage entity 108c of FIG. 1B and performs one or more of the functionalities described above with respect to a storage entity. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some implementations the computing device 800 includes one or more processing units (CPU's) 802 (e.g., processors), one or more output interfaces 803 (e.g., a network interface), a memory 806, a programming interface 808, and one or more communication buses 804 for interconnecting these and various other components.

In some implementations, the communication buses 804 include circuitry that interconnects and controls communications between system components. The memory 806 includes high-speed random access memory, such as DRAM, SRAM, DDR RAM or other random access solid state memory devices; and, in some implementations, include non-volatile memory, such as one or more magnetic disk storage devices, optical disk storage devices, flash memory devices, or other non-volatile solid state storage devices. The memory 806 optionally includes one or more storage devices remotely located from the CPU(s) 802. The memory 806 comprises a non-transitory computer readable storage medium. Moreover, in some implementations, the memory 806 or the non-transitory computer readable storage medium of the memory 806 stores the following programs, modules and data structures, or a subset thereof including an optional operating system 830 and a parity data storage module 840. In some implementations, one or more instructions are included in a combination of logic and non-transitory memory. The operating system 830 includes procedures for handling various basic system services and for performing hardware dependent tasks. In some implementations, the parity data storage module 840 is configured to create parity blocks and compress parity information corresponding to a data segment. To that end, the parity data storage module 840 includes a parity value determination module 841, a parity data generation module 842, a parity data compression module 843, a parity data writing module 844, a decompression module 845 and a request interpretation module 846.

In some implementations, the parity value determination module 841 is configured to calculate a parity value corresponding to a data block set. To that end, the parity value determination module 841 includes a set of instructions 841a and heuristics and metadata 841b. In some implementations, the parity data generation module 842 is configured to generate one or more parity blocks associated with a data segment, and corresponding to one or more data block sets corresponding to the data segment. To that end, the parity data generation module 842 includes a set of instructions 842a and heuristics and metadata 842b. In some implementations, the parity data compression module 843 is configured to compress one or more generated or determined parity data blocks, including in some implementations, generating a link to a master parity value. For example, the parity data compression module 843 determines which block sets corresponding to a data segment are associated with a particular parity value, and creates a link in a parity stripe to that particular parity value. To that end, the parity data compression module 843 includes a set of instructions 843a and heuristics and metadata 843b.

In some implementations, the parity data writing module 844 is configured to write one or more parity blocks, including compressed parity data and/or links to uncompressed or compressed parity data. To that end, the parity data writing module 844 includes a set of instructions 844a and heuristics and metadata 844b. In some implementations, the decompression module 845 is configured to decompress compressed parity data. To that end, the decompression module 845 includes a set of instructions 845a and heuristics and metadata 845b. In some implementations, the request interpretation module 846 is configured to read and extract information from a write request (e.g., received from an ingest storage entity). To that end, the request interpretation module 846 includes a set of instructions 846a and heuristics and metadata 846b.

Although the parity value determination module 841, parity data generation module 842, parity data compression module 843, parity data writing module 844, decompression module 845 and request interpretation module 846 are illustrated as residing on a single computing device 800, it should be understood that in other embodiments, any combination of the parity value determination module 841, parity data generation module 842, parity data compression module 843, parity data writing module 844, decompression module 845 and request interpretation module 846 can reside in separate computing devices in various implementations. For example, in some implementations each of the parity value determination module 841, parity data generation module 842, parity data compression module 843, parity data writing module 844, decompression module 845 and request interpretation module 846 reside on a separate computing device.

Moreover, FIG. 8 is intended more as a functional description of the various features that are present in a particular implementation as opposed to a structural schematic of the embodiments described herein. As recognized by those of ordinary skill in the art, items shown separately could be combined and some items could be separated. For example, some functional modules shown separately in FIG. 8 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
at a fault-tolerant object-based storage system that is part of a cloud-based digital video recorder (DVR) which is configured to record a unique copy of a media item for each one of a plurality of client devices and synthesize parity data in order to protect stored data from loss, the fault-tolerant object-based storage system including a plurality of storage entities each configured to store data on an object-basis and one or more processors:
in response to a request to store a plurality of copies of a data segment, where each copy of the data segment is associated with the unique copy of the media item being recorded for a respective client device for subsequent retrieval:
determining a first parity value for a first data block set of one or more of data block sets, wherein the first data block set comprises one or more respective data blocks each including a set of copies of the data segment, each respective data block associated with a respective storage entity of the plurality of storage entities, wherein the determining includes assessing whether or not the first data block set satisfies a threshold assignment of data blocks having the same data;
in response to assessing that the first data block set satisfies the threshold assignment of data blocks having the same data:
generating a first compressed parity indicator for the first data block set, corresponding to the first parity value; and
storing the first compressed parity indicator in a stripe of parity data in place of the first parity value within a first block set associated with the first data block set.

2. The method of claim 1 further comprising:
comparing the first parity value to a master parity value; and
in response to determining that the first parity value for the first data block set matches the master parity value:
performing the generating and the storing of the first compressed parity indicator.

3. The method of claim 1, wherein generating the first compressed parity indicator includes generating a link to a master parity value when the first parity value matches the master parity value.

4. The method of claim 1, further comprising:
determining a second parity value for a second data block set of the one or more data block sets, wherein the second data block set includes one or more respective data blocks, each respective data block associated with a respective storage entity of the plurality of storage entities;
determining that the second parity value for the second data block set does not match a master parity value; and
storing the second parity value in the stripe of parity data within a second block set comprising the second data block set, in response to determining that the second parity value for the second data block set does not match the master parity value.

5. The method of claim 1, wherein generating the first compressed parity indicator for the first data block set comprises identifying a link to a master parity value.

6. The method of claim 1, wherein the first data block set satisfies the threshold assignment of data blocks when the first data block set includes a respective data block stored at each storage entity of an assigned group of storage entities.

7. The method of claim 1, further comprising:
determining that a subsequent compressed parity indicator for a subsequent data block set is the same as the first compressed parity indicator, when the subsequent data block set satisfies the threshold assignment of data blocks.

8. The method of claim 1, further comprising:
receiving a decompression request to decompress one or more respective compressed parity indicators corresponding to the stripe of parity data;
decompressing the one or more respective compressed parity indicators into decompressed parity values; and
writing out respective copies of the decompressed parity values, wherein each respective copy corresponds to a respective data block set.

9. The method of claim 1, further comprising:
obtaining a write request to write the stripe of parity data corresponding to one or more stripes of content data, wherein a respective stripe of content data is assigned to a respective one of the plurality of storage entities, and the one or more stripes of content data comprise one or more data block sets.

10. A fault-tolerant object-based storage system that is part of a cloud-based digital video recorder (DVR) which is configured to record a unique copy of a media item for each one of a plurality of client devices and synthesize parity data in order to protect stored data from loss, further comprising:
a plurality of storage entities each configured to store data on an object-basis;
an error control module with control links to each of the plurality of storage entities, configured to:
in response to a request to store a plurality of copies of a data segment, where each copy of the data segment is associated with the unique copy of the media item being recorded for a respective client device for subsequent retrieval:
determine a first parity value for a first data block set of one or more data block sets, wherein the first data block set comprises one or more respective data blocks each including a set of copies of the data segment, each respective data block associated with a respective storage entity of the plurality of storage entities, wherein the determining includes assessing whether or not the first data block set satisfies a threshold assignment of data blocks having the same data;
in response to assessing that the first data block set satisfies the threshold assignment of data blocks having the same data:
generate a first compressed parity indicator for the first data block set, corresponding to the first parity value; and
store the first compressed parity indicator in a stripe of parity data in place of the first parity value within a first block set associated with the first data block set.

11. The fault-tolerant object-based storage system of claim 10, wherein the error control module is further configured to:
compare the first parity value to a master parity value; and
in response to determining that the first parity value for the first data block set matches the master parity value, perform the generating and the storing.

12. The fault-tolerant object-based storage system of claim 10, wherein the first compressed parity indicator comprises a link to a master parity value.

13. The fault-tolerant object-based storage system of claim 10 wherein the error control module is further configured to:
determine a second parity value for a second data block set of the one or more data block sets, wherein the second data block set includes one or more respective data blocks, each respective data block associated with a respective storage entity of the plurality of storage entities;
determine that the second parity value for the second data block set does not match a master parity value; and
store the second parity value in the stripe of parity data within a second block set comprising the second data block set, in response to determining that the second parity value for the second data block set does not match the master parity value.

14. The fault-tolerant object-based storage system of claim 10,
where the one or more respective data blocks each include a set of copies of the data segment.

15. The fault-tolerant object-based storage system of claim 10, wherein the first data block set satisfies the threshold assignment of data blocks when the first data block set includes a respective data block stored at each storage entity of an assigned group of storage entities.

16. A system comprising:
a cloud-based digital video recorder (DVR) configured to record a unique copy of a media item for each one of a plurality of client devices, the cloud-based DVR including an object-based storage device configured to synthesize parity data in order to protect stored data from loss at a plurality of storage entities the object-based storage device being configured to:
in response to a request to store a plurality of copies of a data segment, wherein each copy of the data segment is associated with the unique copy of the media item being recorded for a respective client device for subsequent retrieval:
determine a first parity value for a first data block set of one or more data block sets, wherein the first data block set comprises one or more respective data blocks each including a set of copies of the data segment, each respective data block associated with a respective storage entity of the plurality of storage entities;
in response to determining that the first parity value matches a master parity value:
identify a link to the master parity value; and
store the link in a stripe of parity data in place of the first parity value within a first block set associated with the first data block set.

17. The system comprising the cloud-based DVR of claim 16, wherein the object-based storage device is configured to:
compare the first parity value to the master parity value; and
determine that the first parity value for the first data block set matches the master parity value based on the comparing.

18. The system comprising the cloud-based DVR of claim 16, wherein the object-based storage device is further configured to determine that the first parity value matches the master parity value by:

determining that the first data block set satisfies a threshold assignment of data blocks each having the same data.

19. The system comprising the cloud-based DVR of claim 16, wherein the object-based storage device is configured to record the unique copy of the media item for each one of the plurality of client devices in compliance with the Digital Millennium Copyright Act (DMCA).

* * * * *